UNITED STATES PATENT OFFICE.

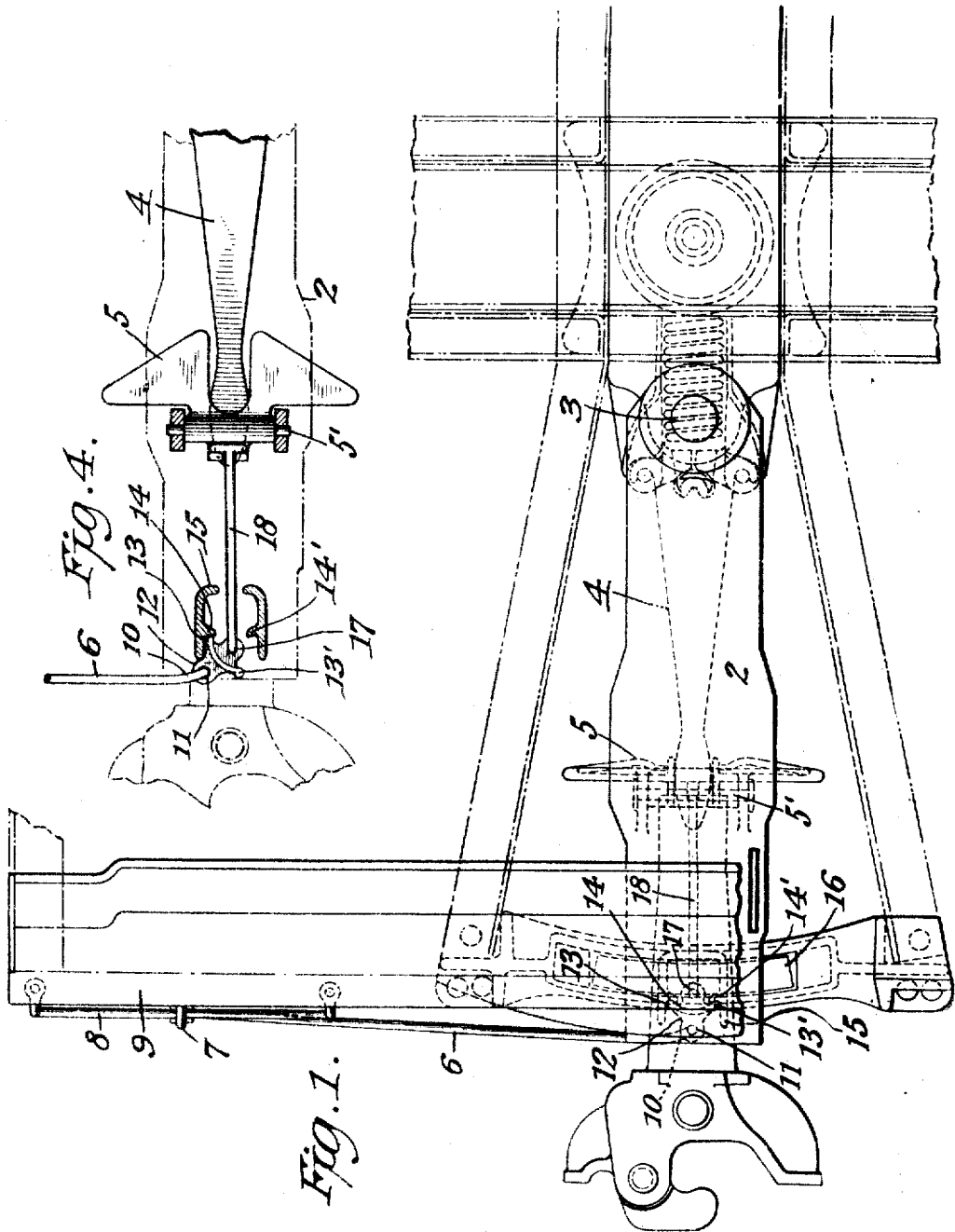
F. R. CAMPBELL.
RADIAL DRAFT GEAR.
APPLICATION FILED SEPT. 16, 1915.
1,267,053.
Patented May 21, 1918.
2 SHEETS—SHEET 1.
Inventor
Frank R Campbell
By his Attorney F. R. CAMPBELL.
RADIAL DRAFT GEAR.
APPLICATION FILED SEPT. 16, 1915.
1,267,053.
Patented May 21, 1918.
2 SHEETS—SHEET 2.
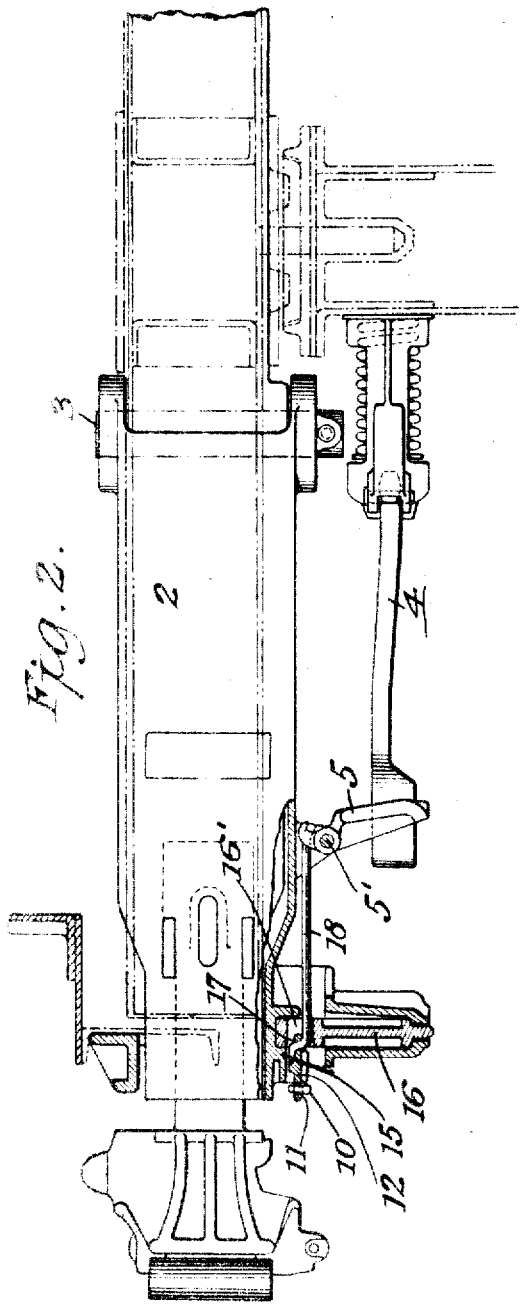
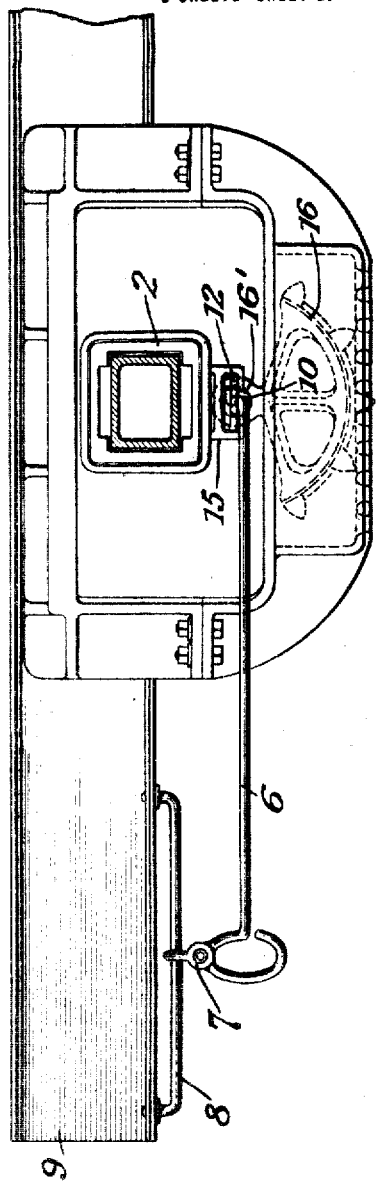
Inventor
Frank R. Campbell
By his Attorney

FRANK R. CAMPBELL, OF CLEVELAND, OHIO, ASSIGNOR TO THE NATIONAL MALLEABLE CASTINGS COMPANY, OF CLEVELAND, OHIO, A CORPORATION OF OHIO.

RADIAL-DRAFT GEAR.

1,267,053.

Specification of Letters Patent.   Patented May 21, 1918.

Application filed September 18, 1915.   Serial No. 50,935.

*To all whom it may concern:*

Be it known that I, FRANK R. CAMPBELL, a citizen of the United States, and a resident of Cleveland, in the county of Cuyahoga and State of Ohio, have invented new and useful Improvements in Radial-Draft Gears, of which the following is a specification, reference being had to the accompanying drawings, in which—

Figure 1 is a plan showing the application of my invention to a radial draft gear; Fig. 2 is a side elevation thereof; Fig. 3 is a front elevation thereof, with the coupler shank in section, and Fig. 4 is a diagrammatic view showing the clutch in disconnected position.

My invention relates to radial draft gears and consists in mechanism for disengaging or rendering inoperative the connection between the draft member and the guiding means, and to permit the draft member to be moved laterally by hand when so disconnected, into position to intercouple on curves with couplers upon cars of ordinary type not equipped with radial draft gear. My invention also relates to the construction and coöperation of the various parts which I shall hereinafter describe and claim.

Referring to the drawings, 2 is the draft member, pivoted at 3 in the usual manner to the car, and 4 indicates the guiding connection carried by the truck. The releasing connection between the draft member 2 and the guiding member 4 consists of a clutch 5, pivoted to the draft member and bifurcated so as to engage opposite sides of the forward end of the guiding member 4, as is described and shown in Letters Patent No. 1,090,656, of Ernest H. Schmidt, dated March 17, 1914.

The release-operating and coupler-swinging mechanism consists of an actuating rod 6, secured at its outer end by a clevis 7 to a guide rod 8 attached to an end sill 9. The rod 6 at its inner end has an angled portion 10, which extends through the eye 11 of the lever 12. The lever 12 is preferably located in the longitudinal center line of the car, and has alternate fulcrum arms 13, 13', which normally bear against shoulders 14, 14' of the casting 15, which also forms the bearing socket for the carrier segment 16. At the rear end of the lever 12 is an eye 17, for attachment of the rod 18, which is secured to the clutch 5 above its pivot 5', and which extends through an aperture 16' in the carrier segment 16, so as to permit a pull to be transmitted from the lever 12 to the clutch 5 in the longitudinal center line of the car.

When a car equipped with the mechanism just described is to be coupled on a curved track to the car having a coupler mounted with the usual limited side clearance, a push or pull upon the actuating rod 6 will cause the lever to fulcrum upon one of the sockets 14 or 14', and, as the lever turns about the socket, the eye 17 will move forwardly, carrying the rod 18 with it and tipping the clutch 5 rearwardly out of engagement with the guiding or centering member 4. The clutch will tip upwardly until it strikes the draft member 2. When the rod 18 has tipped the clutch to this position, the lever 12 will have moved laterally so that its forward portion will strike an inner face of the casting 15 just forward of either shoulder 14 or 14', thereby preventing further rotative movement of the lever. As the lever will then transmit force directly to the housing 15 the connecting rod 18 will be relieved of stress due to centering the coupler, and any further force applied through the actuating rod 6 and the lever 12 will swing the coupler and the draft member laterally into position for coupling with the opposing car when equipped with a draft rigging of ordinary type. When the actuating rod 6 is released, the clutch 5, because of its weight, will drop to normal position. When the draft member is subsequently returned by the relative movement of the car body and truck to a position over the guiding connection arm, the clutch 5, by its contact with the guiding arm 4, will be rotated upwardly and will then fall into engagement with the arm, and the guiding mechanism will become operative.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a radial draft gear provided with a coupler, a horizontally swinging draft member pivotally mounted on a car, a guiding member mounted on a car truck, an intermediate member forming a connection with the draft member and the guiding member, a lever mounted on the draft member connected to the intermediate member, and an actuating rod, said lever having alternative fulcrums, whereby when the actuating rod is actuated in either direction the lever will rotate about one of said fulcrums to disconnect the intermediate member from the guiding member and permit the coupler to swing in the direction of the push or pull applied to the actuating rod.

2. In a radial draft gear provided with a coupler, a horizontally-swinging draft member pivotally mounted on a car, a guiding member mounted on a car truck, an intermediate member forming a connection between the draft member and the guiding member, a lever connected to the intermediate member adapted during actuation to have a fixed bearing on the draft member after the intermediate member is disconnected from the guiding member, and a movable bearing on the draft member during the disconnection of the intermediate member from the guiding member, and an actuating rod movable transversely of the car to actuate the lever to disconnect the intermediate member from the guiding member and to move the draft member transversely into position for coupling with a coupler having a gear of another type.

3. In a radial draft gear provided with a coupler, a guiding member mounted on a truck, a draft member pivotally mounted on a car supporting an intermediate member engaging the guiding member and a lever connected to the intermediate member, an actuating rod adapted by an endwise movement to rotate the lever to disconnect the intermediate member from the guiding member, and a stop on the draft member adapted to limit the rotative movement of the lever, when the intermediate member has been disconnected, whereby further endwise movement of the actuating rod will move the draft member into coupling position with a coupler having a gear of another type.

4. In a radial draft gear provided with a coupler, a horizontally-swinging draft member pivotally mounted on a car, a guiding member mounted on a car truck, an intermediate member forming a connection with the draft member and the guiding member, a lever mounted on the draft member, connected to the intermediate member, and adapted to be actuated transversely in either direction, an actuating member engaging said lever, and a stop shoulder depending from the draft member adapted to limit the movement of the lever, said actuating member being adapted to be moved transversely of the car to actuate said lever to disconnect the intermediate member from the guiding member, and to move the draft member radially after the lever is brought into bearing against said stop member.

FRANK R. CAMPBELL.